(12) United States Patent
Craven et al.

(10) Patent No.: US 10,639,817 B2
(45) Date of Patent: May 5, 2020

(54) HEAT-BONDED POROUS STRUCTURES FROM RECYCLED PLASTICS AND METHODS FOR MAKING

(71) Applicant: Ten Cate Thiolon B.V., Nijverdal (NL)

(72) Inventors: Robin John Craven, Kidderminster (GB); John Grindrod, Malton (GB)

(73) Assignee: Ten Cate Thiolon B.V., Nijverdal (NL)

( * ) Notice: Subject to any disclaimer, the term of this patent is extended or adjusted under 35 U.S.C. 154(b) by 0 days.

(21) Appl. No.: 15/768,026

(22) PCT Filed: Oct. 13, 2016

(86) PCT No.: PCT/NL2016/050704
§ 371 (c)(1),
(2) Date: Apr. 13, 2018

(87) PCT Pub. No.: WO2017/065607
PCT Pub. Date: Apr. 20, 2017

(65) Prior Publication Data
US 2018/0297240 A1    Oct. 18, 2018

(30) Foreign Application Priority Data
Oct. 13, 2015  (GB) .................................. 1518066.4

(51) Int. Cl.
| B29B 17/00 | (2006.01) |
| E02D 31/02 | (2006.01) |
| B29K 105/04 | (2006.01) |
| B29K 105/26 | (2006.01) |
| B29L 7/00 | (2006.01) |

(52) U.S. Cl.
CPC .......... B29B 17/0042 (2013.01); E02D 31/02 (2013.01); *B29K 2105/04* (2013.01); *B29K 2105/26* (2013.01); *B29L 2007/002* (2013.01); *Y02W 30/62* (2015.05)

(58) Field of Classification Search
None
See application file for complete search history.

(56) References Cited

U.S. PATENT DOCUMENTS

2003/0092335 A1* 5/2003 Takaoka ................. B29C 43/02
  442/1
2009/0080976 A1* 3/2009 Anderlind ............. E01C 11/225
  405/45
2013/0270036 A1* 10/2013 Peled ...................... E04B 9/001
  181/294

FOREIGN PATENT DOCUMENTS

| DE | 4413801 A1 | 2/1995 |
| FR | 2700136 A1 | 7/1994 |

(Continued)

OTHER PUBLICATIONS

GB Search Report dated Mar. 30, 2016.
International Search Report dated Mar. 20, 2017.

*Primary Examiner* — Mary Lynn F Theisen
(74) *Attorney, Agent, or Firm* — N.V. Nederlandsch Octrooibureau; Catherine A. Shultz; Katelyn J. Bernier

(57) ABSTRACT

A method of forming end-form structures from recycled plastics includes i) providing molten agglomerated plastics in noodle form; ii) delivering the molten agglomerated plastics to a shaper; iii) forming an end-form of agglomerated plastics in the shaper by controlling movement and/or position of the shaper, the end-form comprising the agglomerated plastics welded together with voids therebetween; and iv) cooling at least an outer profile of the end-form to form the structure.

17 Claims, 6 Drawing Sheets

(56) References Cited

FOREIGN PATENT DOCUMENTS

| | | | |
|---|---|---|---|
| GB | 2426206 | A | 11/2006 |
| GB | 2431896 | A | 5/2007 |
| WO | 2004082912 | A1 | 9/2004 |
| WO | 2014/067681 | A1 | 5/2014 |

* cited by examiner

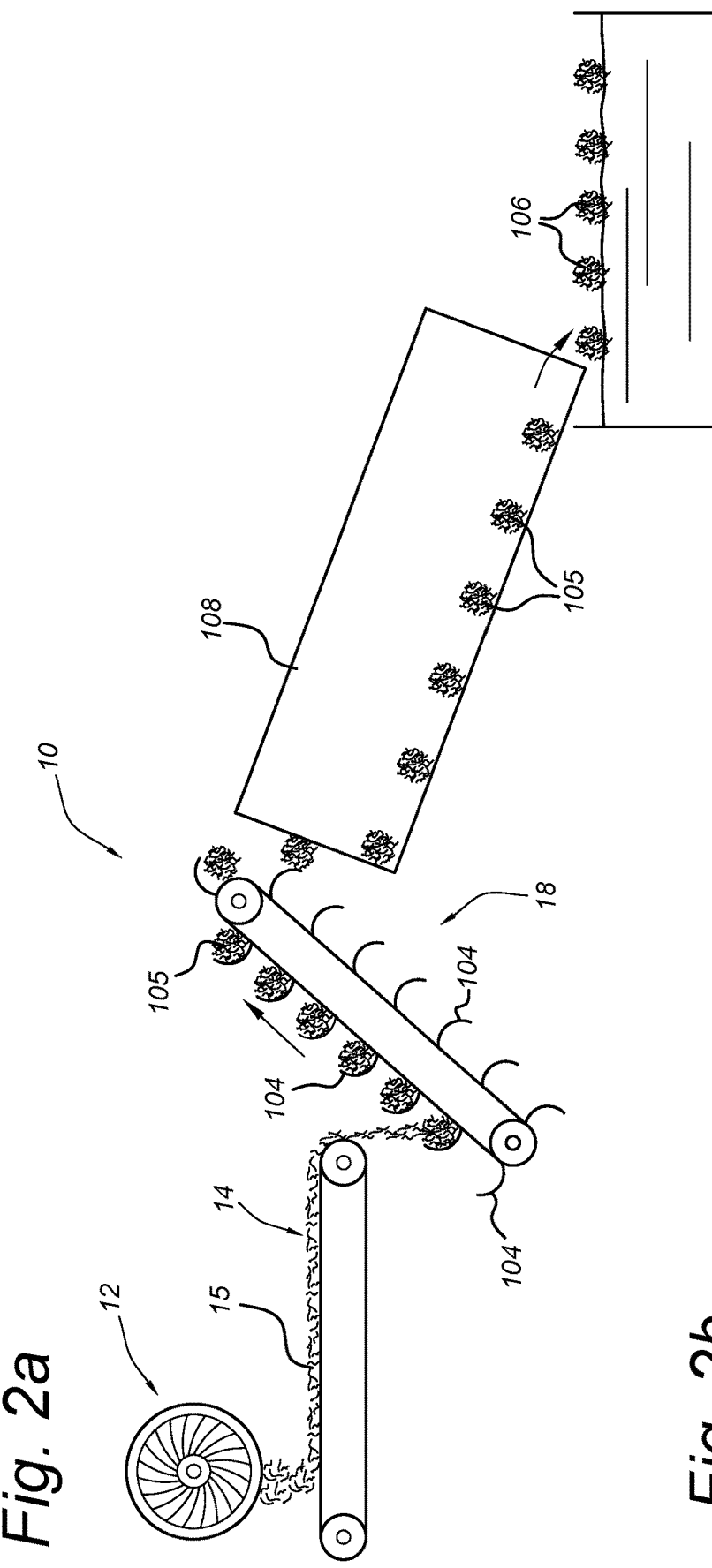
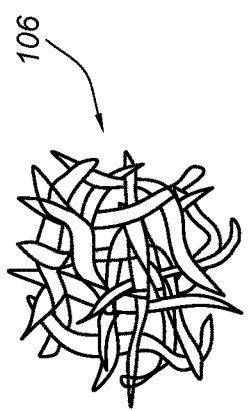

HEAT-BONDED POROUS STRUCTURES FROM RECYCLED PLASTICS AND METHODS FOR MAKING

BACKGROUND

This invention relates to a method of making heat-bonded porous structures from recycled plastics and to such structures.

WO2004/082912 discloses a method of making drainage elements from recycled plastics. In the method, chopped waste thermoplastic plastics are supplied to an agglomerator which heats and agglomerates the plastics into noodles. The heated noodles are then conveyed from the agglomerator via conveyors into a chute of a compactor/shaper funnel. The agglomerated plastics meld together at their contact faces when sufficiently connected and pressed together in the compactor/shaper funnel to form an integral continuous compacted ribbon of melded noodles with spaces therebetween. The ribbon exits through an outlet of the compactor/shaper funnel, where it is turned ninety degrees to be put onto a belt. The belt speed affects the rate at which the compaction occurs. The ribbon is then cooled and chopped into bats. The width and thickness of the ribbon and therefore the bats are limited by the shape and size of the compactor/shaper funnel, and the ninety degree turn when exiting the compactor/shaper funnel. The bats are disclosed to be about 250 mm wide and 50 mm thick, and this size is constant as is further described below.

Because bats are commonly used for drainage or attenuation, it is common to require very large cross-sectional areas of the bats, for example 500 mm wide and 500 mm thick. Using the methods disclosed in WO2004/082912 to form the bats, many bats must be formed and then stacked together to meet the size and/or shape requirements. Thus, the method to form such a drainage area from the bats disclosed in WO2004/082912 is time consuming, and can result in stability issues if not stacked or secured together properly.

In other applications, such as soak away or water treatment applications, very small pieces or different sizes of drainage material are required, for example pieces about the size of a tennis ball. To make such a piece from WO2004/082912, a bat would need to be formed and then cut down to a desired size, requiring a number of extra steps to result in the desired finished product. Simply making the compactor/shaper funnel smaller may result in insufficient weight of the heated malleable noodles within the small compactor/shaper funnel to allow melding of the noodles and pushing the noodles through the compactor/shaper funnel onto the conveyor. If a larger bat were desired, the amount of heat required would likely cause the center noodles to coalesce into a solid non-porous block and lost the ability to hold open spaces between the noodles.

Additionally, some drainage structures require large open spaces and/or interconnections for connecting together. The methods disclosed in WO2004/082912 would not be able to produce such structures.

SUMMARY

According to a first aspect of the invention, a method of forming end-form structures from recycled plastics includes i) providing molten agglomerated plastics in noodle form; ii) delivering the molten agglomerated plastics to a shaper; iii) forming an end-form of agglomerated plastics in the shaper by controlling movement and/or position of the shaper, the end-form comprising the agglomerated plastics welded together with voids therebetween; and iv) cooling at least an outer profile of the end-form to form the structure.

Such a method allows for the formation of a variety of different end-form structures from recycled plastics without the need for additional inserts, such as binders, to hold the end-form together. The molten agglomerated plastics meld together at their contact faces when sufficiently connected and/or pressed together in the shaper. By controlling movement and/or position of the shaper, a large variety of end-form structures can be formed, including smaller or larger end-forms, end-forms with complex shapes and complex extrusions, for example, with a curved side. The method allows for the formation of these complex structures while ensuring that the plastics weld together while maintaining voids between to keep a porous structure. In the present context, molten agglomerated plastics is intended to refer to compositions where all or part of the agglomerated plastics are in an at least partially molten state. This heat is typically imposed by friction ribbing to a melting point, without heating to a point where fully melted or liquefied.

According to an embodiment, the method further comprises cooling the entire end-form. This ensures that the end-form is set to maintain its shape and porous structure internally and externally. Optionally, this can be done with cooling liquid or gases.

According to an embodiment, the method further comprises agglomerating recycled plastics in an agglomerator to produce the molten agglomerated plastics. The agglomerated plastics can all be molten, or only a portion of the plastics can be molten depending on the composition.

According to an embodiment, step ii) comprises delivering the molten agglomerated plastics to a shaper in the form of a sloping, rotating cylindrical tube. This tube can be used to form end-forms in generally rounded or spherical shapes, and can work well to form smaller end-forms.

According to an embodiment, step iii) comprises forming a desired end-form of agglomerated plastics in the shaper by controlling the speed of rotation in the cylindrical tube, the amount of slope of the cylindrical tube and/or the rate at which the molten agglomerated plastics enter the cylindrical tube. The speed of rotation can affect the amount of welding of the molten agglomerated plastics and the resulting noodle to void ratio in the end-form produced.

According to an embodiment, the entire end-form is cooled by delivering the end-form to a cooling vessel. This can provide a quick method of cooling and setting the end-form produced.

According to an embodiment, step ii) further comprises delivering the molten agglomerated plastics to the shaper in clusters of noodles. This can prepare the molten agglomerated noodles for the desired end form by delivering them according to the desired end form. Optionally, step ii) further comprises forming clusters of noodles by delivering molten agglomerated noodles to a plurality of buckets to form a cluster in each bucket, which are then delivered to the shaper. The plurality of buckets can form loose clusters which can be welded into the desired end form in the shaper. The plurality of buckets can also ensure that a generally regularized amount of molten agglomerated noodles are delivered to the shaper such that the end-forms are a regularized size and shape.

According to an embodiment, step ii) comprises delivering the molten agglomerated plastics to a mould. Such a mould could help to shape the desired end-form, and could be used to form a variety of complex shapes from the molten agglomerated noodles.

According to an embodiment, step iii) comprises forming a desired end-form of agglomerated plastics by moving the mould as the molten agglomerated plastics are delivered to the mould. This can ensure that the molten agglomerated plastics are delivered to every part of the mould, and at a rate such that they do not pile up with too much weight or heat in one place, which could cause too much welding, leaving few or no void spaces.

According to an embodiment, moving the mould further comprises moving the mould such that the molten agglomerated plastics are delivered to the mould to build the end-form thickness throughout the mould from the bottom of the mould. This can allow for desired welding of the molten agglomerated noodles in such a way that initial noodles delivered to the mould are able to weld together and partially cool before another layer (adding more weight and heat) is placed on top. This ensures that the desired void to noodle ratio is maintained in the end-form structure.

According to an embodiment, the method further comprises forming connections, cavities, hollows, recesses and/or protrusions in the end-form. These can be formed in a relatively simple manner by using the mould which is shaped for the desired end form, including any desired cavities, hollows, recesses, protrusions, etc.

According to an embodiment, step ii) comprises conveying the molten agglomerated plastics to a chute with one or more vertically oriented profile shaped conveyors.

According to an embodiment, step iii) comprises forming a desired end-form extrusion of agglomerated plastics welded together by flowing the molten agglomerated plastics through a chute shaped to correspond to the desired end-form, and then through one or more vertically oriented profile shaped conveyors. Such a chute and vertically oriented profile shaped conveyors allow for forming a relatively large and/or complex extrusion shape end-form.

According to an embodiment, step iv) comprises cooling an outer surface of the end-form with water jets located within the shaper. Such water jets can be located, for example, between vertically orientated conveyors so that the end-form can be held and the speed of movement of the end-form be controlled. Such outer surface cooling sets an outer profile of the end-form, ensuring the desired end-form profile is maintained.

According to an embodiment, the method further comprises cutting the end-form to a desired length. This allows formation of the desired size of extrusion shape.

According to an embodiment, step i) comprises providing molten agglomerated plastics mixed with one or more of: charcoal, unagglomerated thermoplastics, rubber, vermiculite and fibre. Such additions can be suspended in the final end-form by the noodles, and can provide additional desired qualities to the end-form structure.

According to an embodiment, step iii) comprises controlling movement and/or position of the shaper to form an end-form of agglomerated plastics in the shaper by adjusting a speed of the shaper to affect the amounts of voids in the end-form. For example, molten agglomerated noodles can be delivered to the shaper at a faster speed to produce an end-form structure that is more dense, with less voids; or could be delivered at a slower pace to produce an end-form structure that is less dense, with more voids.

According to an embodiment, the method further comprises a step of adding a blowing agent to reduce the density of the end-form of agglomerated plastics. This would result in noodles which are fatter and less dense, producing an end-form structure that is also less dense.

According to an embodiment, a heat-bonded porous structure comprising recycled thermoplastics material in the form of noodles of agglomerated recycled thermoplastics material is formed according to the method of any of the preceding claims.

According to a further aspect of the invention, a heat-bonded porous structure comprises an integrally formed end-form comprising a plurality of agglomerated plastic noodles welded together with voids therebetween and with at least one curved side. The agglomerated plastic noodles were welded together by connecting or pressing together when in a molten state. Such an integrally formed structure can be formed in a variety of complex shapes and sizes, and can therefore work well to form a variety of different stable porous structures from agglomerated plastics without the need for a binder or other addition to connect and hold the end-form together.

According to an embodiment, the end-form is substantially spherical in shape. These can optionally be formed in relatively small shapes, for example about the size of a tennis ball. This could be useful in water treatment media, as soakaway infill media and loose lightweight infill media to fill void spaces.

According to an embodiment, the drainage structure is an extrusion structure with a cross-section having at least one side which is curved.

According to an embodiment, the density of the end-form is between 250 kgs to 750 kgs per $m^3$, though some end-forms, such as substantially spherical end-forms can have a much lower bulk density. In end-forms where openings are created, for example, a channel through the end form, the density values would change. The methods disclosed allow for controlling of the density of the end-form as desired by controlling movement and/or position of the shaper. This allows for a larger variety of end-forms to be produced according to the desired characteristics.

According to an embodiment, the voids form about 35% to 75% of the end-form.

According to an embodiment, the agglomerated plastic noodles have a size about 5 mm to 10 mm in diameter and can vary in their lengths, for example from about 5 mm-100 mm or more. Additionally, the diameter and/or length could vary depending on desired end-form structure and requirements for that.

According to an embodiment, the end-form has a smallest dimension of at least 50 mm mm.

According to a further aspect of the invention, a heat-bonded drainage element comprises an integrally formed end-form of a plurality of agglomerated plastic noodles welded together when in a molten state, the end-form with voids therebetween, and with a channel formed through the end-form, the channel preferably having a minimum diameter of more than 50 mm.

According to a further aspect of the invention, a drainage structure comprises a plurality of drainage elements, aligned together such that the channels are continuous.

BRIEF DESCRIPTION OF THE DRAWINGS

FIG. 1b is a side section through an agglomerator suitable for use with the apparatus of FIG. 1a.

FIG. 2a shows a first embodiment of an apparatus which produces heat bonded plastics with a porous structure.

FIG. 2b shows an end-form loose cluster produced by the apparatus of FIG. 2a.

FIG. 3b shows a mould used in the apparatus of FIG. 3a.

FIG. 3c shows an end-form produced from the apparatus of FIG. 3a.

FIG. 4b shows a portion of a shaper used in the apparatus of FIG. 4a.

FIG. 4c shows an end-form produced from the apparatus of FIG. 4a.

DETAILED DESCRIPTION

Figure 1A:
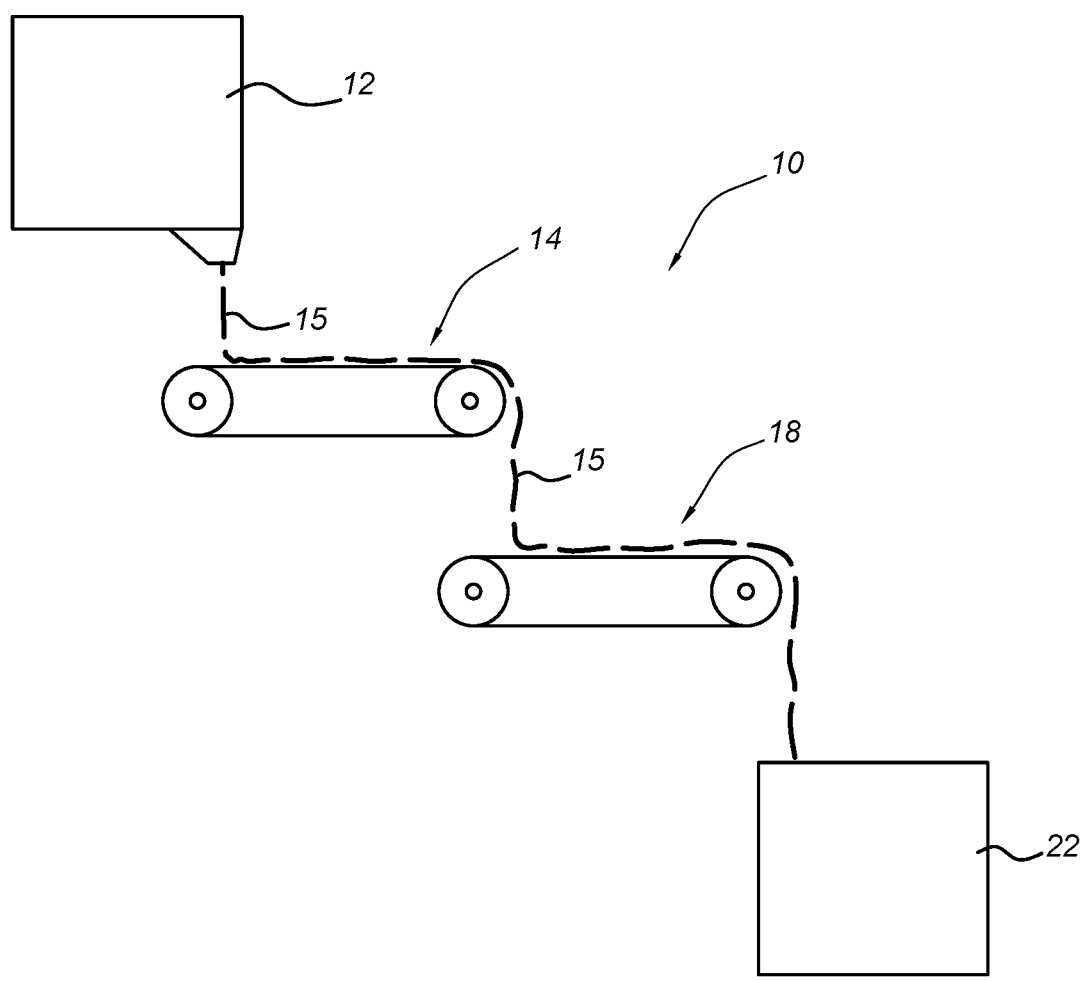
FIG. 1a is a schematic illustration of an apparatus for forming an end-form structure from recycled plastics.

FIG. 1a is a schematic illustration of an apparatus 10 for producing an end-form structure from recycled plastics. Apparatus 10 includes an agglomerator 12, intermediate conveyor 14, delivery conveyor 18 and shaper 22.

Agglomerator 12 is positioned such that molten agglomerated noodles 15 formed in agglomerator 12 fall onto intermediate conveyor 14. Conveyor 14 then delivers molten agglomerated noodles 15 to delivery conveyor 18, which can take a variety of different configurations depending on shaper 22 and the rest of apparatus 10. The molten agglomerated noodles 15 can then be delivered to shaper 22 where they will be formed into a desired end-form of agglomerated plastics. The forming is done by having a shaper 22 which can produce a desired end-form, and controlling movement and/or position of that shaper 22 to produce the desired profile of the end-form while maintaining the desired structure of heat-bonded welding of noodles 15 with a plurality of open spaces into the profile. The final end-form is a one-piece, integral structure having sufficient strength to remain intact on subsequent handling, and with a plurality of spaces between noodles 15. The open matrix of spaces in the end-forms can allow water and/or other liquids or gases to flow with relative freedom, making the end-forms ideal drainage elements for underground irrigation and drainage purposes. The specific methods of making the end-form structures will be discussed in more detail in relation to specific embodiments of apparatus 10 (and particularly shaper 22), shown in FIGS. 2a-4c.

Figure 1B:
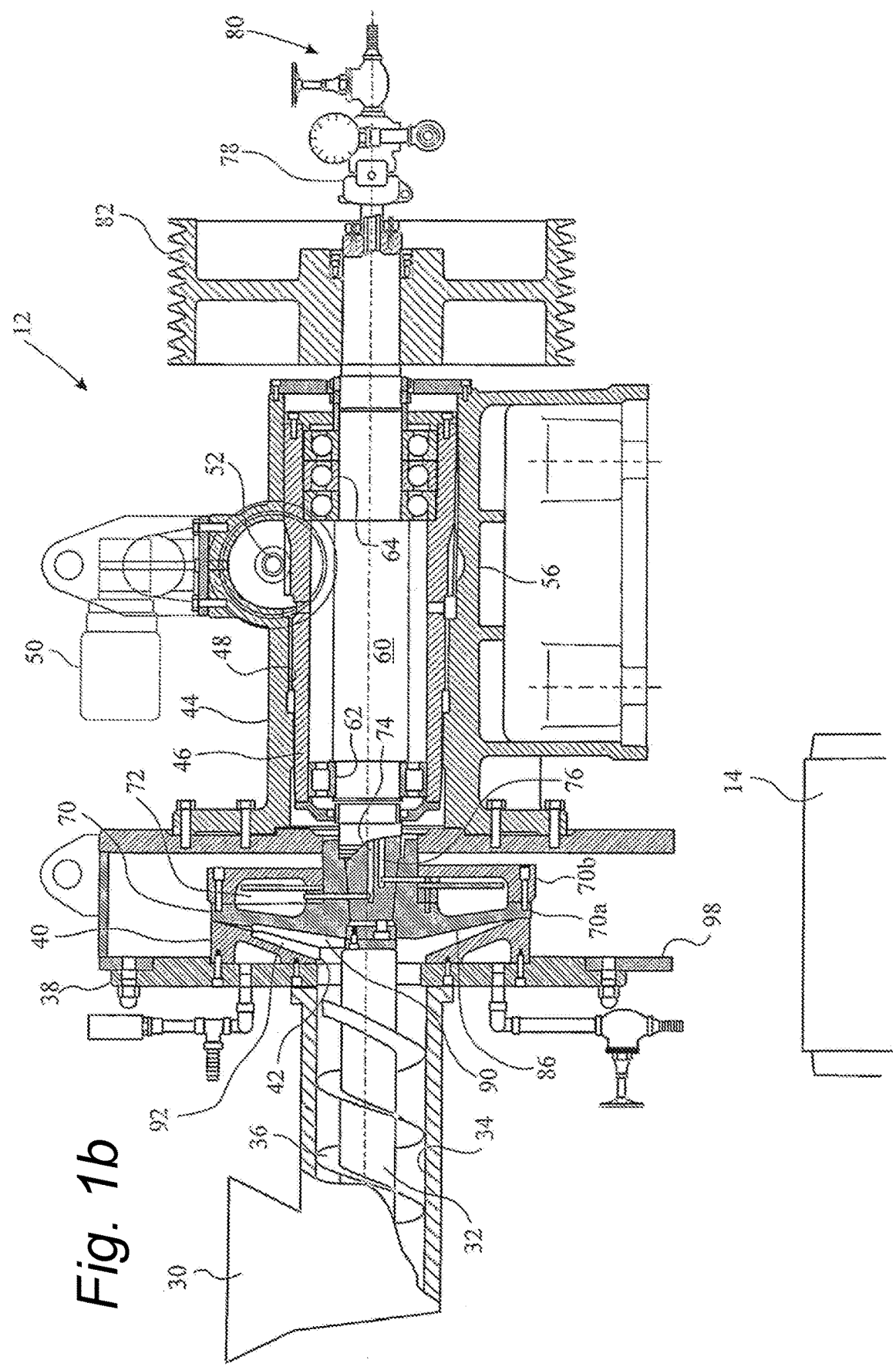

FIG. 1b is a side section through a dual plate type agglomerator 12, which is suitable for use with apparatus 10.

Agglomerator 12 works to form molten noodles of recycled plastics material, which may be mixed with and/or include other materials, such as charcoal, unagglomerated thermoplastics, rubber, vermiculite, fibres and/or blowing agent. Agglomerator 12 can include hopper 30 which receives the material to be agglomerated. This can be through a feed conveyor or other means of adding material on a continuous or intermittent basis. The base of the hopper 30 can include an extruder Archimedes screw 32 that transports the material along the barrel 34 of the agglomerator 12. Flights 36 of the screw 32 can become increasingly tight so that waste material is compressed as it progresses along the barrel 34. Barrel 34 is connected to an agglomerator chamber housing 38 which mounts a fixed circular, dished, agglomeration plate 40. Plate 40 is fixed in the housing 38, and has a central circular inlet opening 42, through which the compressed waste material passes.

A main housing 44 of agglomerator 12 mounts an axially adjustable shaft carriage 46 that is threaded in internal threads 48 of the housing 44. A motor 50 operates to rotate a worm drive 52 (through drive linkages not shown or further described). Worm drive 52 is engaged with a ring gear 56 formed on the shaft carriage 46. Thus, rotation of worm drive 52 rotates carriage 46 about its longitudinal axis, screwing it into or out of housing 44, and thereby adjusting its axial position therein. Shaft carriage 46 rotatably mounts a drive shaft 60 though bearings 62, 64, and extends into agglomeration chamber 38 and terminates with a round, domed agglomeration plate 70. Plate 70 is formed in two parts 70a, 70b to define a water-cooling chamber 72. Water is fed from the other end of shaft 60 though central bore 74 and evacuated through parallel bore 76. At the distal end of shaft 60, a rotary coupling 78 permits attachment of a cooling water supply 80. Also on the distal end of shaft 60 is mounted a drive pulley 82 to drive shaft 60 by a motor (not shown).

Plates 40, 70 are nested against one another. In the face of plate 70, a number of radiating grooves are disposed somewhat inclined to the radius of plate 70. Also on the face 86 are disposed a number of radially inclined ridges 90. By virtue of their inclination to the radius, they tend to transport material caught between plates 40, 70 radially outwards.

The face of plate 40 corresponds substantially with the face 86 of plate 70, and has similar ridges 92 on its face. Depending on the axial position of the shaft carriage 46, the ridges 90, 92 have a friction rubbing and shearing action on material between them when the shaft 60 is rotated. As shaft 60 rotates, the continuous friction rubbing caused by the ridges 90, 92 generates heat in the plastics material. Consequently, the thermoplastics substantially begin to soften at least to some extent. This softening is typically to around its melting point without becoming fully melted or liquefied.

The face of plate 40 is more dished than the face of plate 70 is domed. This means that the plastics material is squeezed into a progressively tighter space as it extrudes radially outwardly. In this event, the only outlet for the material worked is through the space between the plates 40, 70. By the time the thermoplastics materials have reached this point, at least a portion of them have softened considerably, and have become at least partially molten. So they are extruded from the grooves as spaghetti-like noodles that break and fall through an open bottom 98 of the agglomeration chamber 38.

Underneath opening 98, intermediate conveyor 14 is disposed. By adjusting the worm screw 52, and adjusting the separation between the plates 40, 70, the degree of friction rubbing and shearing of the plastics material between the two plates can be controlled. Screw 32 is shown abutting shaft 60 but is not driven by it. Shaft 60 rotates at a different speed than screw 32, and so the latter is provided with its own independent drive (not shown).

Prior to molten agglomerated noodles 15 falling onto intermediate conveyor 14, conveyor 14 can be sprayed with water or another liquid or gas to cool and/or wet the conveyor 14. This can prevent molten agglomerated noodles 15 from immediately sticking to the conveyor and can help to cool the molten agglomerated noodles 15 so that their surfaces become petrified so that they do not adhere to the conveyor but still remain molten internally, preventing the molten agglomerated noodles 15 from coalescing and forming a solid mass.

Conveyor 14 delivers molten agglomerated noodles 15 to delivery conveyor 18. Delivery conveyor 18 can then deliver molten agglomerated noodles 15 as desired to shaper 22. This can be a steady stream of noodles or delivery in batches, whichever form is required by apparatus 10 and shaper 22 to produce a desired end-form structure. FIG. 2a shows a first embodiment of apparatus 10 which produces an end-form of small loose clusters 106 of heat bonded plastic noodles 15 with a porous structure. FIG. 2*b* shows an end-form cluster 106 produced by apparatus 10.

Apparatus 10 includes agglomerator 12, intermediate conveyor 14, delivery conveyor 18, shaper 22 and cooling tank 102. Agglomerator 12 can be the type shown and described in FIG. 1*b* or another dual disc agglomerator. Delivery conveyor 18 is a bucket type or deep flighted elevator conveyor with a plurality of buckets 104 for carrying clusters 105 of molten agglomerated noodles 15. Shaper 22 is a rotating cylindrical tube 108, such as a drum, that is sloped.

Cooling tank 102 can be a vessel of cooling water or another liquid to fix the shape and structures of the end-forms exiting shaper 22. In other embodiments, the cooling can be done in another way, for example, with a conveyor that is sprayed with a cooling liquid.

In operation of apparatus 10, chopped plastics are provided to agglomerator 12, which heats the plastics to a homogeneous condition so that malleable molten agglomerated noodles 15 of softened plastics exit agglomerator 12. Agglomerator 12 is located such that noodles 15 exit agglomerator 12 onto intermediate conveyor 14. Intermediate conveyor 14 must be able to withstand temperatures of molten agglomerated noodles 15 and be non-stick such that molten agglomerated noodles 15 do not stick to conveyor 14. This can be done, for example, by spraying conveyor 14 with water and/or using various coatings to make the surface non-stick.

Intermediate conveyor 14 delivers molten agglomerated noodles 15 to delivery conveyor 18. The speed of conveyor 14 and conveyor 18 are set such that a desired amount of molten agglomerated noodles 15 are delivered to each bucket 104 to form a cluster 105 within that bucket. The molten agglomerated noodles heat bond weld together at their contact faces to form clusters 105. The set speeds of conveyors 14, 18 result in each end-form cluster 106 being a generally regularized size. Clusters 105 of molten agglomerated noodles 15 within buckets 104 do not generally fully coalesce due to the temperature and weight of each cluster 105, but will typically become heat bond welded at multiple contact points at their contact faces where pressed together. The temperature will also generally make clusters 105 stay soft and malleable.

Delivery conveyor 18 then deposits each cluster 105 into rotating cylindrical tube 108 of shaper 22. Clusters 105 move in a rolling and tumbling action from an entrance of cylindrical tube to an exit. The rolling and tumbling action of the clusters 105 of melded noodles forms the end-form cluster 106 into a generally spherical shape and further increases the number of welded connections within each separate end-form cluster 106 but maintains multiple open spaces between heat bonded noodles 15 within each end-form cluster 106. The speed of rotation and amount of slope of tube 108 can be adjusted to control the melding of the end-form clusters 106 of the noodles 15, and the density of the end-form produced. The speed of rotation affects the melding of clusters 105 into end-form clusters 106, with a faster speed resulting in more welded connections and a slower speed resulting in less welded connections and more open spaces or voids within end-form clusters 106. The slope of cylindrical tube 108 provides movement along the tube 108 to subject clusters to more or less rolling and tumbling actions when moving from the entrance of the tube to the exit.

At the exit of the tube 108, end-form clusters 106 are delivered for cooling. Cooling in this embodiment is done by dropping end-form clusters 106 into cooling tank 102, which can be a vessel of cooling water or another liquid to fix the shape and structures of the end-forms (clusters 106) exiting shaper 22. In other embodiments, cooling can be done in another way, for example, with a conveyor that is sprayed with a cooling liquid or gas. After cooling, end-form clusters 106 can be gathered and stored.

As shown in FIG. 2*b*, end-form clusters 106 produced by apparatus 10 of FIG. 2*a* are generally spherical in shape and contain open spaces. By using a delivery conveyor 18 with buckets 104 and a rotating sloping drum 108 as a shaper 22, apparatus 10 is able to produce end-form structures that are relatively small from heat-bond welded agglomerated plastic noodles 15. These are desirable for a variety of applications, for example, in water treatment media, as soakaway infill media and loose lightweight infill media to fill void spaces. End-form clusters 106 can be, for example, the size of a tennis ball with a diameter of about 6.5-7 cm, or another size depending on system components (bucket size 104, cylinder size 108, etc.) and/or desired end-form size and shape. An end-form could have voids forming about 35% to 75% of the end-form, but these percentages can change depending on end-form desired qualities and usage.

Figure 3A:
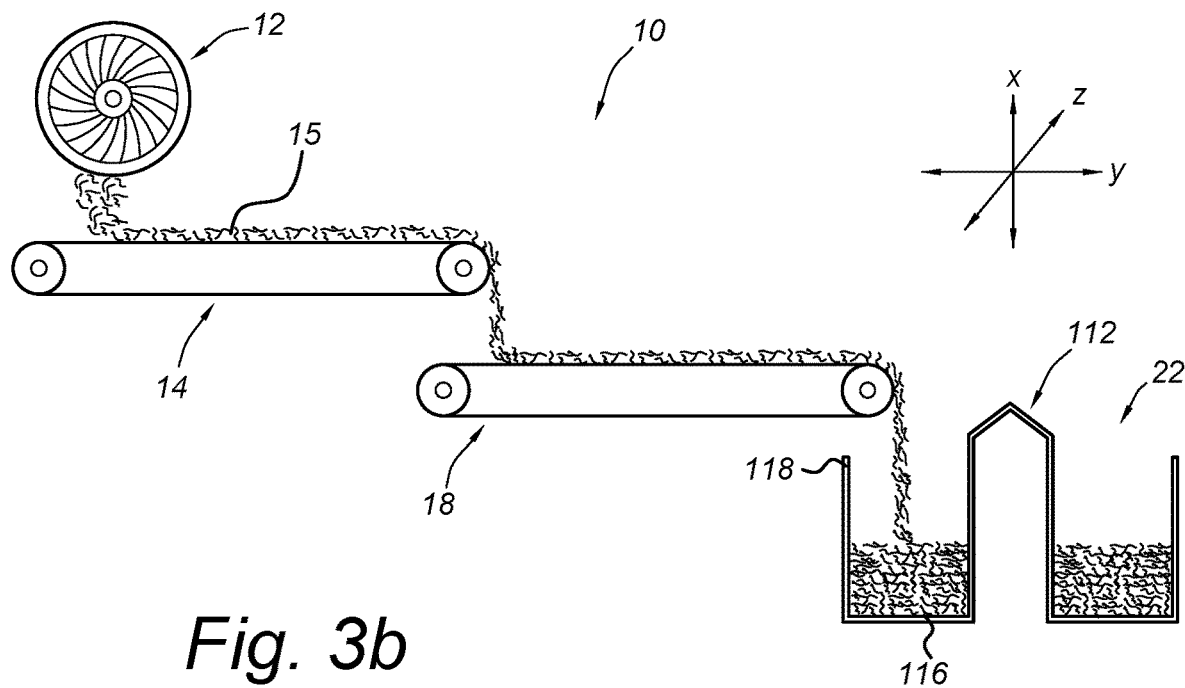
FIG. 3a shows a second embodiment of an apparatus which produces heat bonded plastics with a porous structure.
Figure 3B:
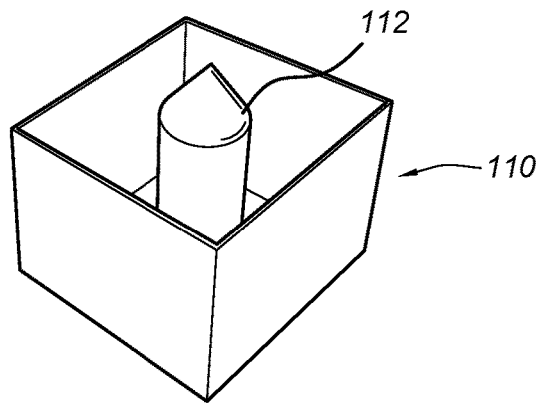
Figure 3C:
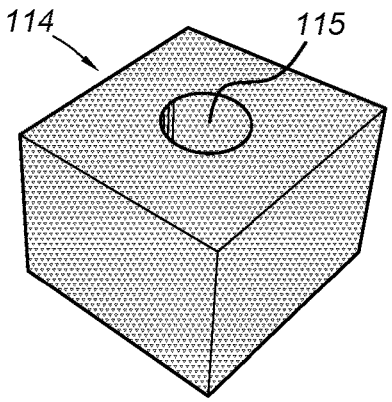

FIG. 3*a* is a second embodiment of apparatus 10, which uses a movable mould 110 as shaper 22. FIG. 3*b* shows the mould 110, and FIG. 3*c* shows an end-form 114 shape produced by apparatus 10.

Apparatus 10 shown in FIG. 3*a* includes agglomerator 12, intermediate conveyor 14, delivery conveyor 18 and mould 110 as shaper 22. Mould 110 includes a centre portion 112 to form a void 115 in end-form 114.

As in apparatus of FIG. 2*a*, agglomerator 12 heats chopped plastics to form agglomerated noodles 15 of softened or molten plastics. The heat is such that a significant portion can become heat-bond welded together at their contact faces when sufficiently connected and pressed together, but still maintain void spaces between noodles 15.

Molten agglomerated noodles 15 are then delivered to conveyor 14, which can withstand the temperature and ensure that noodles 15 do not stick to conveyor 14. From conveyor 14, noodles 15 are delivered to delivery conveyor 18. Delivery conveyor 18 then delivers molten agglomerated noodles 15 into mould 110.

Mould 110 is shaped corresponding to a desired end-form 114, and can include inserts, projections, etc. to form different cavities, shapes, connecting parts, etc. Mould is able to move in all directions to ensure that molten agglomerated noodles 15 accumulate evenly in mould 110 without leaving unfilled spaces, building up from a bottom 116 to a top 118 of mould 110. This movement can be automated to ensure a very even build-up of noodles 15 in end-form 114. Movement also ensures that a sufficient quantity of molten agglomerated noodles 15 are accumulated evenly and welding between heated noodles 15 occurs, but that the total quantity of molten agglomerated noodles 15 at any point is limited to ensure that the weight and temperature do not build up to levels which would result in the noodles 15 becoming overly compressed and/or overheated, and possibly coalescing into a solid block. Predetermined movements of mould 110 in synchronization with the stream of molten agglomerated noodles 15 from conveyor 18 allows a depth of heat bonded porous structure to be gradually increased within the mould 110 without leaving unfilled spaces.

Once the desired amount of noodles 15 have been delivered to mould 110, cooling can be done while end-form 114 is still in mould 110, and can be passive cooling (simply letting the end-form and mould cool), or can be active cooling, for example using a liquid or gas to quicken the cooling process. Then, end-form 114 can be removed from mould 110, and will maintain open spaces 115, as shown in FIG. 3c.

Using a moveable mould 110 allows for a variety of shapes of end-form 114, including very thick shapes, shapes with hollows, recesses or protrusions, and other shapes of end-forms which were not possible in prior art methods which formed products from recycled plastic noodles. By using a movable mould 110, end-form 114 can be built up gradually from bottom 116 to top 118, allowing for proper heat bond welding between molten agglomerated noodles 15 but ensuring that a proper distribution is made and that no area has too many noodles 15 or too much heat at a certain time to prevent over compression and overheating. Additionally, once one mould 110 has been filled with noodles 15, another different mould can be placed into apparatus, allowing for efficiently producing a variety of different shaped end-forms by having a variety of different moulds 110. This method can allow for a wide variety of three-dimensional end-forms 114, and can be especially useful in end-forms that require large open spaces, for example, if the end-form is being used as a soak-away, water storage, infiltration or attenuation system for stormwater or for increased flow rates or irrigation applications.

Figure 4A:
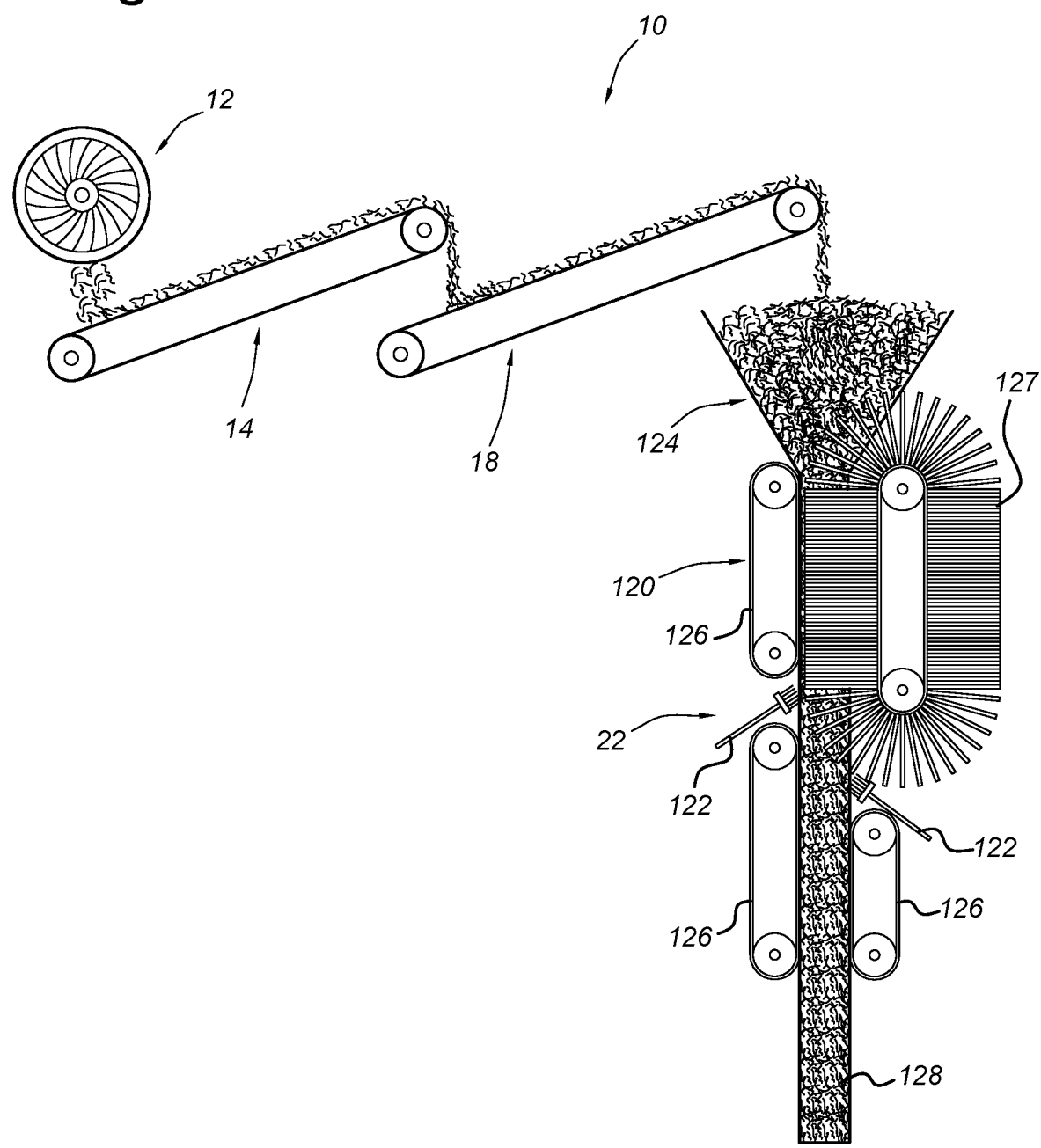
FIG. 4a shows a third embodiment of an apparatus which produces heat bonded plastics with a porous structure.
Figure 4B:
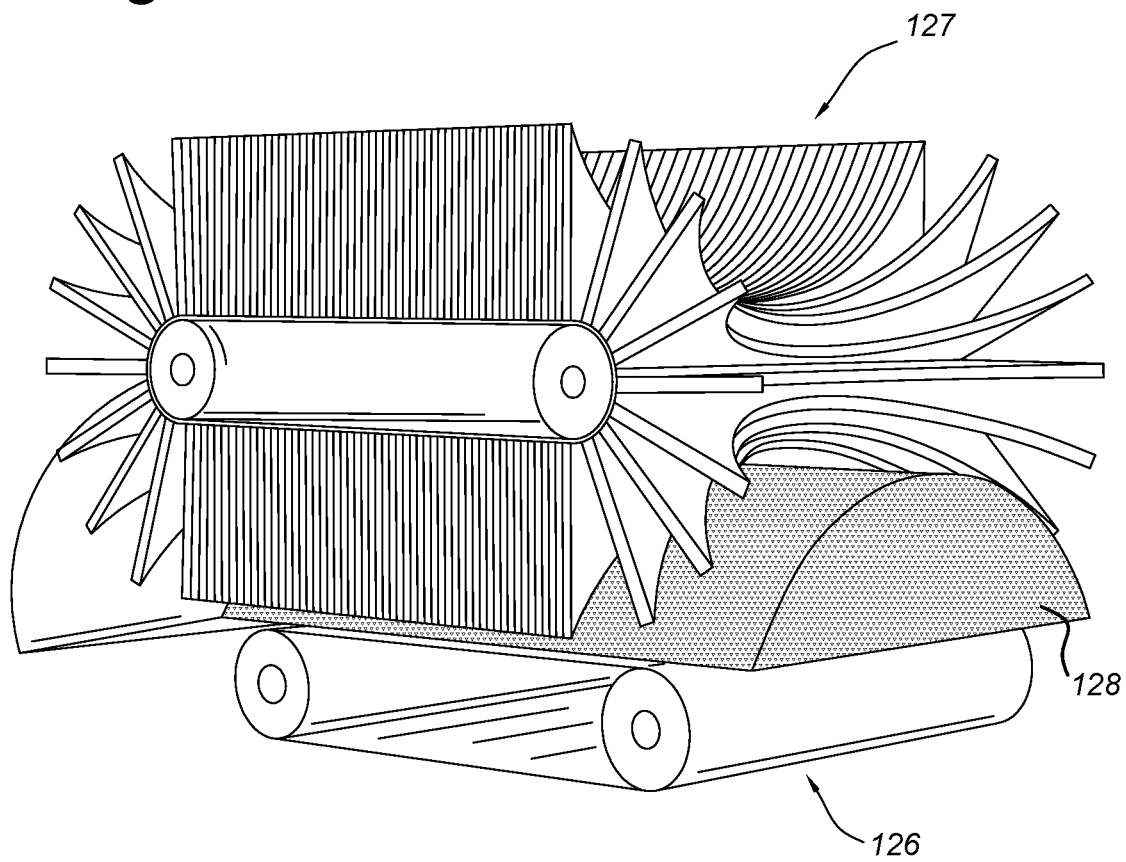
Figure 4C:
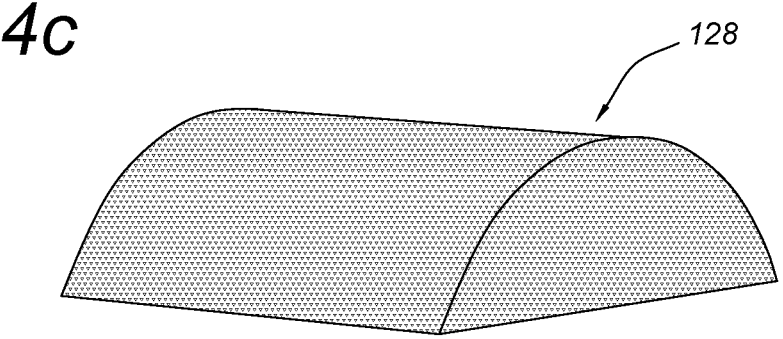

FIG. 4a is a third embodiment of apparatus 10 with a profile shaped conveyor 120 as shaper 22. Apparatus 10 shown in FIG. 4a includes agglomerator 12, intermediate conveyor 14, delivery conveyor 18, shaper 22 and cooling jets 122. FIG. 4b shows a portion of the shaper 22, and FIG. 4c shows the end-form 128 which apparatus 10 produces.

Profile shaped conveyor 120 includes chute 124 and one or more conveyors 126, 127 which form a desired end-form profile shape. In this embodiment, three vertically oriented, generally flat conveyors 126 are shown, and one conveyor 127 has a semi-circular shape to form an end-form profile 128 which is flat on one side and rounded on the other side. Conveyor 127 is formed from segmented sections that make the shape of the intended end form. In some embodiments, conveyor 127 could be a flexible conveyor belt shaped to produce the intended end-form.

In operation, apparatus 10 of FIG. 4a starts in much the same manner as apparatus 10 of FIGS. 2a-3a. Agglomerator 12 agglomerates plastics to form molten agglomerated noodles 15. Conveyors 14, 18, deliver these molten agglomerated noodles 15 to shaper 22 without noodles 15 sticking to conveyors 14, 18.

Chute 124 of shaper 22 receives molten agglomerated noodles 15, and is shaped to correspond to a desired end-form extrusion profile. Chute 124 aligns closely with conveyors 126, 127; which are arranged to give continuous moving surfaces to a final extrusion shape that is being formed. Conveyors 126, 127 work to move and shape welded end-form extrusion coming out of chute 124. Cooling jets 122 are arranged to spray an outside of the end-form 128 for fixing a profile shape of the end-form 128 being made. Speed of conveyors 126, 127 are controlled according to the desired buildup of noodles 15 in chute 124 and the desired compression and heat bonding of molten agglomerated noodles 15, therefore controlling the desired ratio of noodles 15 to void spaces in end profile formed. All conveyors 126, 127 are typically moving at the same speed. By controlling the head of molten agglomerated noodles 15 in chute 124, the speed of shaper 22 conveyors 126, 127 and including cooling jets 122; sufficient melding can be achieved without allowing excessive build-up of weight of molten agglomerated noodles and/or build up of temperature within end-form 128 prior to cooling. This results in an end-form 128 which is sufficiently melded into a porous structure without allowing molten agglomerated noodles 15 to coalesce into a solid block.

After exiting shaper 22, end-form 128 can be cut to any required length. By having a moving, profile shaped conveyor 120 as a shaper 22, and with outer cooling jets 122; an end-form 128 with a variety of desired profiles can be formed. The vertical orientation of conveyors 126, 127 allows for an increase in cross-sectional thickness as well compared to prior art methods, as the extruded end-form 128 is not turned ninety degrees as in the prior art methods (which caused stretching and compression). For example, a typical thickness could be between about 100 mm and 350 mm. Thus, end-form 128 is able to be formed substantially larger and in more complex shapes, allowing formation of more varieties of draining structures than prior art methods.

In summary, apparatus 10 and particularly shaper 22 of the embodiments shown allow for a variety of complex and differently sized and shaped drainage structures with different characteristics (i.e., porosity, density) to be formed of recycled plastic materials agglomeratored into noodles 15 without the need for additional binders or other material to hold end-forms together. In the prior art methods, the forming of drainage material and dimensions was limited by the compactor/funnel used. If larger or smaller sizes were needed they would have to be formed by extra manufacturing steps (cutting or stacking together) which resulted in less efficient production and less stable end products.

By forming shaper 22 with controlled movements, shaper 22 allows for the formation of end structures with molten agglomerated noodles 15 that are stable and securely bonded together, while maintaining open spaces at a desired ratio within the structure without a lot of finishing steps. Agglomerator 12 can agglomerate plastics into noodles 15, and heat the noodles using mechanical energy to a generally homogenous condition such that a substantial number of them are molten. Adjustments can be made in agglomerator 12 to affect the size, physical character and/or temperature of molten agglomerated noodles 15 produced to maintain a desired and substantially regularized output. This allows for using recycled waste plastics that may be of different types and/or sources (and that melt at different temperatures and/or have different properties when melted or re-melted), and may include residual fractions of other material. The process allows for these to be captured and bound in the resulting end-form structure, helping to preserve the porous nature of the structure by aiding interstitial space.

Additionally, other additives and/or inclusions, such as a blowing agent and/or chips of fibre, rubber, vermiculite, solid thermoplastics and/or charcoal could be added to the agglomerator 12. This can result in different qualities in the end-form, such as retention of water, which is desirable during dry periods in end-forms used for irrigation purposes. The addition of a blowing agent would result in fatter, less dense noodles 15, preferably having an open cell structure. That would make the resulting end-form less heavy, and may give it greater water retention through penetration of the noodles themselves and retention thereby.

Noodles 15 can be about 5 mm-10 mm in diameter and can vary in their lengths, for example from about 5 mm-100 mm or more. Noodles 15 can also vary in diameter if desired for a specific application. Typically, when describing the noodles as "molten", it means that they are at a temperature where at least a portion of them are soft and malleable and able to weld to another noodle at contact faces when pressed or connected together. Temperatures at which noodles 15 will become molten will vary based on the composition of the agglomerated plastics (and possibly other additions) which form noodles 15. Some plastics will become molten at higher temperatures than others. Additionally, apparatus 10 could add or remove heat from system at points other than agglomerator 12, for example, at conveyors 14, 18 and/or shaper 22, to maintain the desired temperature to achieve the desired molten state of noodles 15. While the terms "molten agglomerated noodles" or "molten agglomerated plastics" are used, these encompass compositions where only a portion of the noodles/plastics are in at least a partially molten state.

Because the malleable noodles 15 exiting agglomerator 12 are heated to a generally homogenous condition and hold sufficient temperature, noodles 15 can be made to become heat-bond welded together at their contact faces when sufficiently connected and/or pressed together (without the need for binders), but still maintain multiple open spaces between each noodle 15.

Shaper 22 can take a variety of forms, as shown in the embodiments disclosed, and helps to form the desired end-form from noodles 15. A rotating sloping cylinder 108 (along with a particular delivery conveyor 18) can be used to make end-form clusters 106. A moveable mould 110 can be used to form a variety of shapes according to the shape of the mould 110, including very thick end-forms and/or end-forms with large open spaces, hollows, recesses, cavities, connection points and/or protrusions. A shaped chute 124 with one or more vertically oriented, shaped conveyors 126, 127 and outer cooling jets 122 can be used to form extrusion end-forms with a variety of profiles, and particularly thicker or profiles with more complex shapes, for example with at least one side which is curved. By using a shaper 22 which has controllable movements and/or positions, apparatus 10 can form stable desired end-form shapes of drainage material with desired properties (density, etc.) without requiring a lot of extra finishing steps. This results in a more flexible apparatus 10 and methods for making draining products into the shapes and sizes desired for specific applications.

While end-forms can have different shapes, sizes and properties, a density of about 250 kgs to 750 kgs per $m^3$ is typically present in end-form to ensure sufficient stability and porosity. The percentage of end-form which is comprised of the voids can vary, but can be in the range of about 35%-75%, for example.

While different cooling methods are shown, including cooling jets and a cooling vessel, cooling could also be performed in other ways, for example, by simply leaving the end-form out at room temperature or in a cooler area to cool naturally, or introducing a cooling gas to the area and/or to be directed toward the end-form. Conveyors 14, 18 can also take many different forms depending on the desired delivery of noodles 15 to shaper 22. For example, if it is desired to have noodles 15 build up in shaper 22 gradually or if it is desired to deliver a number at a time, conveyors 14 and/or 18 can take different configurations to help facilitate this.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A method of forming end-form structures from recycled plastics, the method comprising:
   i) providing a plurality of noodles of molten agglomerated plastic;
   ii) delivering the molten agglomerated plastic noodles to a shaper in the form of a sloping, rotating cylindrical tube;
   iii) forming an end-form of agglomerated plastic noodles in the shaper by controlling movement and/or position of the shaper, the end-form comprising the agglomerated plastic noodles welded together with voids therebetween; and
   iv) cooling at least an outer profile of the end-form to form the structure.

2. The method of claim 1, and further comprising cooling the entire end-form.

3. The method of claim 1, and further comprising agglomerating recycled plastics in an agglomerator to produce the molten agglomerated plastic noodles.

4. The method of claim 1, wherein step iii) comprises:
   forming a desired end-form of agglomerated plastic noodles in the shaper by controlling the speed of rotation in the cylindrical tube, the amount of slope of the cylindrical tube and/or the rate at which the molten agglomerated plastic noodles enter the cylindrical tube.

5. The method of claim 1, wherein step ii) further comprises delivering the molten agglomerated plastic noodles to the shaper in clusters of noodles.

6. The method of claim 5, wherein step ii) further comprises forming clusters of noodles by delivering molten agglomerated noodles to a plurality of buckets to form a cluster in each bucket, which are then delivered to the shaper.

7. The method of claim 1, wherein step i) comprises:
   providing molten agglomerated plastic noodles mixed with one or more of: charcoal, unagglomerated thermoplastics, rubber, vermiculite and fibre.

8. The method of claim 1, wherein step iii) comprises:
   controlling movement and/or position of the shaper to form an end-form of agglomerated plastic noodles in the shaper by adjusting a speed of the shaper to affect the amounts of voids in the end-form.

9. The method of claim 1, and further comprising a step of adding a blowing agent to reduce the density of the end-form of agglomerated plastic noodles.

10. A heat-bonded porous structure comprising recycled thermoplastics material in the form of noodles of agglomerated recycled thermoplastics material formed according to the method of claim 1, wherein the agglomerated plastic noodles are welded together by connecting or pressing together when in a molten state, and the end-form is substantially spherical in shape.

11. The heat-bonded porous structure of claim 10, wherein the voids make up about 35% to 75% of the end-form and/or the agglomerated plastic noodles have a size between 5 mm to 10 mm in diameter and about 5 mm to 100 mm length.

12. A method of forming end-form structures from recycled plastics, the method comprising:
   i) providing a plurality of noodles of molten agglomerated plastic;
   ii) delivering the molten agglomerated plastic noodles to a mould;

iii) forming an end-form of agglomerated plastic noodles in the mould by moving the mould as the molten agglomerated plastics are delivered to the mould, the end-form comprising the agglomerated plastic noodles welded together with voids therebetween and further comprising forming connections, cavities, hollows, recesses and/or protrusions in the end-form; and iv) cooling at least an outer profile of the end-form to form the structure.

13. A method of forming end-form structures from recycled plastics, the method comprising:

i) providing a plurality of noodles of molten agglomerated plastic;

ii) conveying the molten agglomerated plastic noodles to a shaper comprising a chute with one or more vertically oriented profile shaped conveyors;

iii) forming an end-form of agglomerated plastic noodles in the shaper by controlling movement and/or position of the shaper, the end-form comprising the agglomerated plastic noodles welded together with voids therebetween; and iv) cooling at least an outer profile of the end-form to form the structure.

14. The method of claim 13, wherein step iii) comprises: forming a desired end-form extrusion of agglomerated plastic noodles welded together by flowing the molten agglomerated plastic noodles through a chute shaped to correspond to the desired end-form, and then through the one or more vertically oriented profile shaped conveyors.

15. The method of claim 14, wherein step iv) comprises: cooling an outer surface of the end-form with water jets located within the shaper.

16. A heat-bonded drainage element formed by the method of claim 13, and comprising an integrally formed end-form of a plurality of agglomerated plastic noodles welded together when in a molten state, the end-form with voids therebetween, and with a channel formed through the end-form, the channel having a minimum diameter of more than 50 mm.

17. Drainage structure comprising a plurality of drainage elements according to claim 16, aligned together such that the channels are continuous.

* * * * *